(12) United States Patent
Fluck

(10) Patent No.: US 7,408,461 B2
(45) Date of Patent: Aug. 5, 2008

(54) METAL DETECTION SYSTEM AND METHOD

(75) Inventor: Frederick Dean Fluck, Idaho Falls, ID (US)

(73) Assignee: Controlled Capture Systems, LLC, Idaho Falls, ID (US)

( * ) Notice: Subject to any disclaimer, the term of this patent is extended or adjusted under 35 U.S.C. 154(b) by 304 days.

(21) Appl. No.: 11/329,676

(22) Filed: Jan. 10, 2006

(65) Prior Publication Data

US 2008/0136631 A1 Jun. 12, 2008

Related U.S. Application Data

(60) Provisional application No. 60/642,768, filed on Jan. 11, 2005.

(51) Int. Cl.
*G08B 13/24* (2006.01)
(52) U.S. Cl. .................. 340/551; 324/244; 324/243
(58) Field of Classification Search ............... 340/551; 324/243, 244, 326
See application file for complete search history.

(56) References Cited

U.S. PATENT DOCUMENTS

| | | | |
|---|---|---|---|
| 3,713,156 A | 1/1973 | Pothier | |
| 3,781,664 A | 12/1973 | Rorden | 324/247 |
| 3,971,983 A | 7/1976 | Jaquet | |
| 4,021,725 A | 5/1977 | Kirkland | 324/227 |
| 4,068,164 A | 1/1978 | Schwartz et al. | 324/253 |
| 4,417,352 A * | 11/1983 | Shepard | 377/43 |
| 4,734,643 A | 3/1988 | Bubenik et al. | 324/232 |
| 4,962,473 A * | 10/1990 | Crain | 340/541 |
| 5,227,800 A | 7/1993 | Huguenin et al. | |
| 5,321,361 A | 6/1994 | Goodman | 324/326 |
| 5,334,981 A | 8/1994 | Smith et al. | |
| 5,493,517 A | 2/1996 | Frazier | 324/243 |
| 5,494,035 A | 2/1996 | Leuthold et al. | |
| 5,499,182 A * | 3/1996 | Ousborne | 701/35 |
| 5,504,428 A | 4/1996 | Johnson | 324/243 |
| 5,552,705 A | 9/1996 | Keller | |
| 5,572,125 A | 11/1996 | Dunkel | 324/307 |
| 5,692,446 A | 12/1997 | Becker et al. | |
| 5,694,498 A | 12/1997 | Manasson et al. | |
| 5,694,867 A | 12/1997 | Diaz-Lopez | |
| 5,842,986 A | 12/1998 | Avrin et al. | |
| 6,037,776 A | 3/2000 | McGlone | 324/345 |
| 6,133,829 A * | 10/2000 | Johnstone et al. | 340/551 |
| 6,150,810 A * | 11/2000 | Roybal | 324/244 |
| 6,228,743 B1 * | 5/2001 | Chen et al. | 438/401 |
| 6,359,582 B1 | 3/2002 | MacAleese et al. | |
| 6,362,739 B1 * | 3/2002 | Burton | 340/572.6 |
| 6,418,335 B2 | 7/2002 | Avrin et al. | |
| 6,435,013 B1 * | 8/2002 | Rodriguez et al. | 73/61.75 |
| 6,480,141 B1 | 11/2002 | Toth et al. | |
| 6,496,713 B2 | 12/2002 | Avrin et al. | |

(Continued)

*Primary Examiner*—George A Bugg
*Assistant Examiner*—Hoi C Lau
(74) *Attorney, Agent, or Firm*—Zarian Midgley & Johnson PLLC

(57) ABSTRACT

This application describes a system for contraband and weapons detection. The system comprises a coplanar sensor array, electronic drive circuitry, a data acquisition circuit, a video frame grabber, a video camera, and a computer control unit with a control module installed. Properly constructed and aligned, the system allows for the detection of very small magnetic moments, which surround ferromagnetic materials. This ferromagnetic detection allows users to screen personnel for contraband electronic devices and concealed weapons.

24 Claims, 5 Drawing Sheets

U.S. PATENT DOCUMENTS

| | | |
|---|---|---|
| 6,594,591 B2 | 7/2003 | Clark et al. .................... 702/35 |
| 6,701,335 B2 | 3/2004 | Pupalaikis .................. 708/300 |
| 6,956,369 B2 | 10/2005 | Czipott et al. ............... 324/244 |
| 6,970,086 B2 * | 11/2005 | Nelson ....................... 340/551 |
| 7,013,245 B2 | 3/2006 | Kotter et al. |
| 7,113,092 B2 * | 9/2006 | Keene ........................ 340/551 |
| 7,119,572 B2 * | 10/2006 | Malik et al. ................... 326/38 |
| 7,275,012 B2 * | 9/2007 | Hermerding, II ............ 702/136 |
| 2002/0035792 A1 * | 3/2002 | Scalese et al. ................ 34/259 |
| 2004/0027120 A1 * | 2/2004 | Rippingale ................. 324/253 |
| 2004/0080315 A1 * | 4/2004 | Beevor et al. ................ 324/244 |
| 2004/0100357 A1 * | 5/2004 | Kruse ......................... 338/128 |
| 2004/0147833 A1 | 7/2004 | Czipott et al. |
| 2004/0147834 A1 | 7/2004 | Czipott et al. |
| 2004/0189293 A1 | 9/2004 | Czipott et al. |
| 2004/0217862 A1 * | 11/2004 | Castle et al. ................ 340/552 |
| 2005/0225383 A1 * | 10/2005 | Li et al. ...................... 329/304 |
| 2005/0242817 A1 * | 11/2005 | Hoult ......................... 324/326 |
| 2005/0265054 A1 * | 12/2005 | Luu ............................. 363/89 |
| 2007/0133844 A1 * | 6/2007 | Waehner et al. ............. 382/118 |

\* cited by examiner

METAL DETECTION SYSTEM AND METHOD

RELATED APPLICATION

This application claims priority to U.S. Provisional Patent Application No. 60/642,768, filed Jan. 11, 2005 and entitled CONCEALED CONTRABAND AND WEAPONS DETECTION APPARATUS, the disclosure of which is incorporated herein by reference in its entirety.

BACKGROUND

This disclosure relates generally to systems and methods for detecting metallic objects and, more specifically, to systems and methods for detecting concealed weapons and/or contraband.

Many different kinds of metal detection systems are known and are used in a wide range of situations in order to provide added security against violent crimes and terrorist attacks. Well known, is the use of metal detection screening systems to screen for concealed weapons in airports, and increasingly they are being used in courthouses, schools, and other public and governmental facilities that may be subject to threats or attacks.

Currently, there is an increased demand for contraband screening systems by industries, represented by banks, convenience stores, sports arenas, amusement parks, and concert venues. Many of these industries are looking for screening systems that are low cost, to allow the installation of these devices at all entrances of their desired secured zones. These industries prefer screening systems that have very high throughput rates to allow for continuous movement of incoming customers at venue entrances.

In some applications, there is a desire to utilize screening systems to not only screen for concealed weapons, but also to detect and limit the entry of items such as video/audio recorders, digital cameras, and other copyright-encroaching electronic devices. In some applications, it is also desired that the screening systems are covert in appearance, to not diminish the customer's experience as they enter an event.

BRIEF DESCRIPTION

The above-mentioned drawbacks associated with existing metal detection systems are addressed by embodiments of the present application, which will be understood by reading and studying the following specification.

In one embodiment, a metal detection system comprises a sensor array comprising a plurality of magnetic field fluxgate sensors mounted on a support structure, the sensors being arranged to define a sensing region within the sensor array. The system further comprises electronic drive circuitry in communication with each magnetic field fluxgate sensor, the electronic drive circuitry comprising one or more filtering digital mixers and a frequency-to-voltage converter. The system further comprises data acquisition circuitry in communication with the electronic drive circuitry of each magnetic field fluxgate sensor, a video camera aimed at the sensing region of the sensor array, and a video frame grabber in communication with the video camera. The system further comprises a computer control unit comprising a control module and a user interface, the computer control unit in communication with the data acquisition circuitry and the video frame grabber.

In another embodiment, a metal detection system comprises an array of magnetic field sensors mounted on a support structure, each sensor being configured to generate an output signal having a frequency that is substantially proportional to a magnetic field detected by the sensor. The system further comprises means for physically aligning the magnetic field sensors and means for electronically tuning the magnetic field sensors. The system further comprises electronic drive circuitry in communication with each magnetic field sensor and data acquisition circuitry in communication with the electronic drive circuitry of each magnetic field sensor. The data acquisition circuitry is configured to communicate with a computer via USB cabling.

In another embodiment, a method for detecting ferromagnetic objects within a sensing region of an array of magnetic field fluxgate sensors comprises receiving a signal to initiate a data acquisition and image acquisition cycle, generating a plurality of first output signals, each first output signal having a frequency that is substantially proportional to a magnetic field detected by a corresponding magnetic field fluxgate sensor, and generating a plurality of second output signals, each second output signal having a frequency that substantially comprises an absolute difference between the frequency of a first output signal and the frequency of a corresponding background reference signal. The method further comprises converting the frequency of each second output signal to a corresponding voltage level, acquiring an image of a person within the sensing region of the array of magnetic field fluxgate sensors, and displaying the image of the person, overlaid with data representing the voltage levels corresponding to the frequencies of the plurality of second output signals. The overlaid data indicates the magnitude and location of magnetic moments surrounding ferromagnetic objects within the sensing region.

These and other embodiments of the present application will be discussed more fully in the detailed description. The features, functions, and advantages can be achieved independently in various embodiments of the present application, or may be combined in yet other embodiments.

DRAWINGS

Like reference numbers and designations in the various drawings indicate like elements.

DETAILED DESCRIPTION

Figure 1:
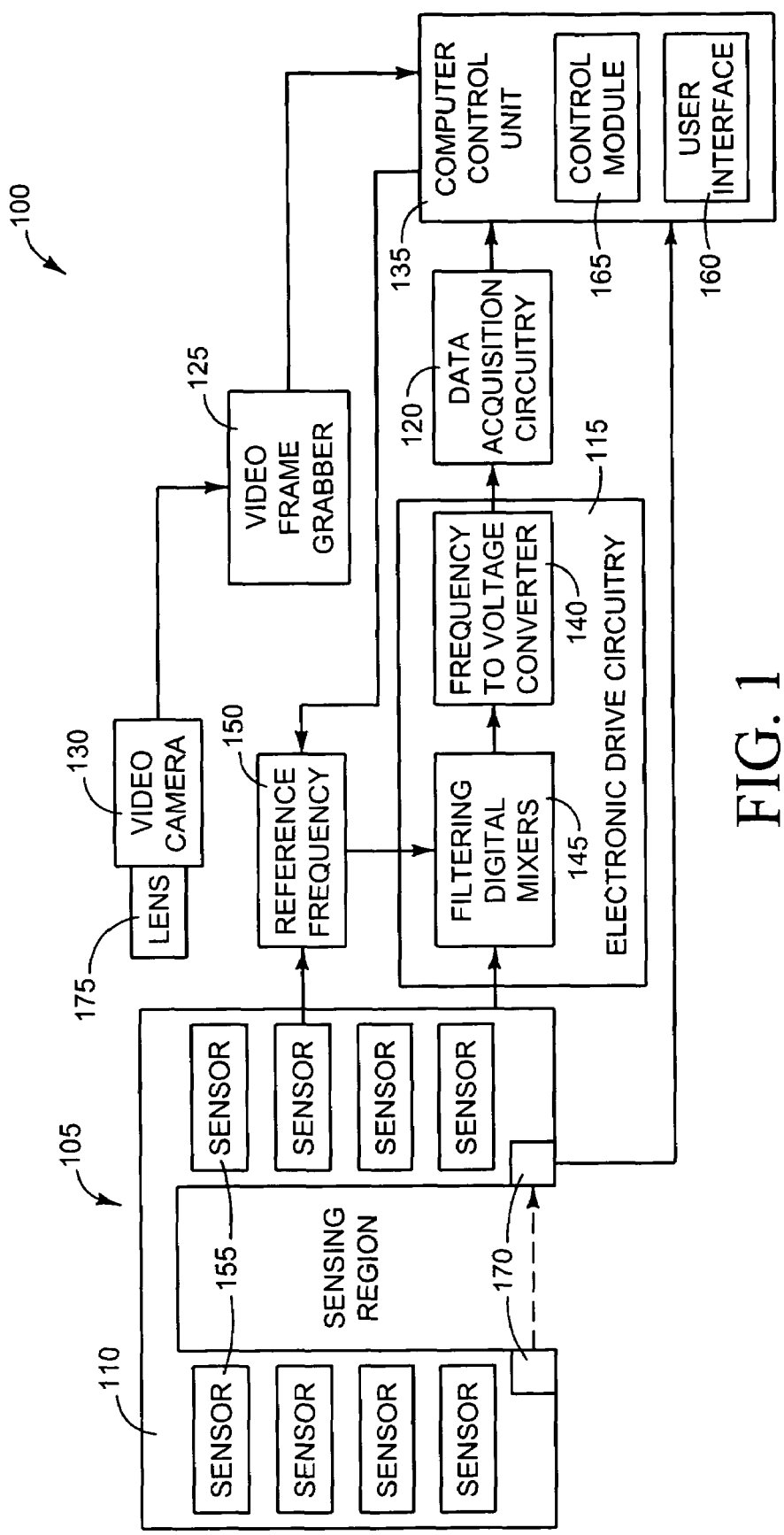
FIG. 1 is a block diagram of a metal detection system in accordance with one embodiment of the present application.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the present invention. The following detailed description is, therefore, not to be taken in a limiting sense.

Many metal detectors currently available do not fully meet industry specific needs for one reason or another. This application describes a new concealed weapons and contraband detection screening system. This new system advantageously incorporates certain desirable features, such as contraband detection capabilities, low per unit cost, high patron throughput rate, and versatile design for covert operation and installation.

The design criteria for the screening system involve magnetic field sensors that are sensitive enough to detect not only weapons, but also sensitive enough to detect the small magnetic fields that surround electronic devices. Many interested users consider electronic recording devices to be a very high threat to their business, as they rely on copyright licensing to operate profitably. Statistically, electronic recording devices are used during presentations to steal copyrighted material. This pirated material compromises the exclusivity of the copyrighted material and greatly reduces industry profits.

The newly designed weapons/contraband screening system utilizes unique methods to detect very small magnetic fields, using commercially available magnetic field sensors and components. The assembled sensor modules are highly sensitive and respond to magnetic field moments very quickly. In some embodiments, the walk-through gateway making up the weapons/contraband screening system comprises an array of these sensor modules. This sensor array is constructed of two columns of sensor modules. People walk between these columns, through the sensing region, for the screening process. This sensor array is tuned, physically and electronically, to itself, which enhances the sensitivity of the sensor array.

Digital imagery of the screened individual is obtained during a screening process. The imagery is taken to provide positive data tracking for the data collected during the screening process. The imagery is saved only when the individual has a detected contraband item or weapon. The imagery is utilized by the control module to aid the system operator in visually locating the detected contraband item. The imagery can be acquired from a variety of digital camera technologies such as analog and digital video cameras, USB cameras, Firewire cameras, or wireless network cameras. The system may be set to not obtain imagery of screened clients. In this mode, the system can substitute a universal patron icon in place of the imagery and utilize a time-stamp identifier for data tracking of the data collected during the screening process.

The system's sensor array output data and imagery is sent to the computer control unit via standard interface cabling. The computer control unit can be any desktop personal computer or laptop style computer, which has suitable control software installed. The sensor array output data and digital imagery can be sent to the computer control unit through interface cables, USB cabling, Ethernet, or through a wireless network device. An advantage of utilizing these listed methods is that one computer control unit can read the data output of many screening gateways, as the gateways can be designed as independent network-connectable computer peripherals.

The designed system utilizes a control module that applies artificial intelligence to aid in translating whether the detected item is a threat or non-threat item. This artificial intelligence is in the form of simple algorithmic functions. By instilling more advanced artificial intelligent algorithms, such as neural network functions or fuzzy logic style functions, further filtering of commonly known items that cause false-positive readings, such as under wires in brassieres and steel shanks in shoes, can be achieved. The control module can also be modified to detect only predetermined items for access control, using electromagnetic badges or identification tags.

The control module can utilize audible alarms, door closures, or other security mechanisms to aid the operator in detaining contraband-carrying personnel. The control module can be programmed to send the gateway output data and imagery to remote security stations via wireless links, cellular telephone links, or email and Internet links. The control module can be modified to interface with other computer applications for patron badge creation or other biometric applications.

The design of this screening gateway takes into consideration the criterion that the screening system be covert. There exists a desire to not have the patron even be aware that he or she is being screened. This renders conventional metal detection equipment unattractive due to its conspicuous appearance. The new system utilizes an array of small sensors to detect contraband items. This sensor array is not rigid by design and can be configured in many variations for contraband detection purposes. The small sensors can be placed in structures to mimic arena décor, be mounted into doorway moldings of entrances, be incorporated within landscaping concrete commonly used throughout amusement and theme parks, or be enclosed into other non-magnetic structural configurations.

The design of the system described in this application provides the flexibility to detect weapons and electronic recording devices through the hardware's configuration and the software's use of artificial intelligence. The design takes into consideration the requirements of high throughput rates for patron screening. The designed system has an approximate throughput rate of about 1,000 persons per hour. The cost savings through component selection, allows the system to be offered at a low cost, compared to conventional metal detection systems. The design is versatile in that it can be installed in a covert fashion at facilities. The designed system's hardware and software can be modified for the implementation of weapons/contraband screening by a wide variety of end users.

FIG. 1 is a block diagram of a metal detection system 100 in accordance with one embodiment of the present application. As illustrated in FIG. 1, the system 100 comprises a coplanar sensor array 105, which is built on a support structure 110, electronic drive circuitry 115 to convert the sensor array's output data to voltage or detection levels, a data acquisition circuit 120 to read these detection levels, a video frame grabber 125 and a video camera 130 to obtain imagery of the screened individual. The system 100 further comprises one or more infrared break-beam devices 170 mounted on the support structure 110, and a computer control unit 135 with a user interface 160 and a control module 165 installed to operate the system 100.

As used herein, the term "module" may refer to any combination of software, firmware, or hardware used to perform the specified function or functions. It is contemplated that the functions performed by the modules described herein may be embodied within either a greater or lesser number of modules than is described in the accompanying text. For instance, a single function may be carried out through the operation of multiple modules, or more than one function may be performed by the same module. The described modules may be implemented as hardware, software, firmware or any combination thereof. Additionally, the described modules may reside at different locations connected through a wired or wireless telecommunications network, or the Internet.

In the illustrated embodiment, the electronic drive circuitry 115 comprises a frequency-to-voltage converter 140 coupled to filtering digital mixers 145, which are, in turn, coupled to a reference frequency generator 150. The hardware, when assembled and properly calibrated as described in this application, enables an operator to screen clients for contraband electronic hardware and ferrous containing concealed weapons.

In the illustrated embodiment, the coplanar sensor array 105 consists of eight magnetic field sensors 155, four sensors on each side. The sensors 155 are mounted onto the support structure 110, which is constructed of non-magnetic material. The support structure 110 is preferably built such that people can walk through the sensing region. In some embodiments, the recommended head clearance height of the support structure 110 is approximately 80 inches, with the walk-through or sensing region inside width of approximately 30 inches. The support structure 110 may be constructed from any non-magnetic material such as wood, plastic, or aluminum. The support structure 110 is preferably sturdy and strong enough to support the sensors 155, support electronics, and wiring for the sensor array 105.

The electronic drive circuitry 115 may comprise signal-processing electronics configured to convert the output signal generated by each sensor 155, which is a frequency signal proportional to the magnetic field detected, to voltage or detection levels. In operation, these detection levels are read into the computer control unit 135 by the data-acquisition circuit 120, which can be installed into the computer control unit 135 and controlled by the control module 165.

The video frame grabber 125 can be installed into the computer control unit 135. The frame grabber 125 is used to acquire an image from the video camera 130. The camera 130 is aimed at the sensing region of the sensor array 105, such that the camera 130 captures imagery of the person as they walk through the sensing region during a screening process. The image data is utilized by the control module 165 for data identification purposes and detected contraband/weapon item location determination.

The control module 165 manipulates the sensor array's output data from the electronic drive circuitry 115, and displays this data onto the user interface 160. This user interface 160 displays the highest detection level recorded by each sensor 155 during the screening process event. The detection level of each sensor 155 is overlaid, in conjunction, at each sensor's physical location, on an acquired image. This image is taken during the screening process and is displayed along with the resultant data on the user interface 160, to aid the operator in determining the location of the item detected.

The user interface 160 allows the system operator to manually operate the system 100 and to adjust various alarm set points and colors, to aid the operator in differentiating between non-threat and threat items. These set points are utilized, by the control module 165 to display to the operator the type of alarm that existed during the screening process, by using color.

For example, the system 100 may be set up to alert the operator of any detected low magnetic field items, such as electronic recording devices. Here the medium detection level alarm set points would be set at low to medium values, and the medium detection level alarm color would be set to yellow. This enables the control module 165 to alert the operator of a detected low magnetic field item, by showing on the user interface 160 a yellow background after a screening event.

For weapons, which are surrounded by a much larger magnetic fields, the high detection level alarm set point, would be set at medium to high detection level values and the high detection level alarm color would be set to red. This enables the control module 165 to alert the operator of detected high magnetic field items, with a red background on the user interface 160. Individuals who have no contraband items on their person during a screening event would have no alarm condition. In this case, the system 100 would display its default color after a screening event.

In some embodiments, the magnetic field sensors 155 comprise commercially-available magnetic field fluxgate sensors. An example fluxgate sensor for use in this design is Speake and Company's, FGM-3 fluxgate magnetic field sensor. The fluxgate sensors utilize a magnetically permeable core material that is periodically saturated by a drive coil that is wound around the core material. A second wound coil, the sensing coil, is wound perpendicular around the drive coil and core. This sensing coil detects any changes in the core material's magnetic permeability, caused by magnetic fields near the sensor, through electromagnetic action. With careful design implementation, these fluxgate sensors are able to detect very small magnetic fields in the range of about ±50 micro-tesla.

Since each sensor 155 has a sensitivity of a few percent due to power variations, it is desirable to provide in the design, power regulation and electronic filtering. This prevents power variations and external electrical noise components from interfering with the sensitivity of the sensors 155. In some embodiments, power regulation and filtering is accomplished by providing each sensor 155 with a doubly regulated and filtered input power circuit. A 12-volt direct current (DC) power supply is used to power the screening system 100. An example 12-volt DC power supply that may be used is Phihong's model PSA31U-120, 120-volt alternating current (AC) to 12-volt DC power supply. The double regulation circuitry reduces the system's 12-volt power to the 5-volt DC power required by certain sensors 155.

Figure 2:
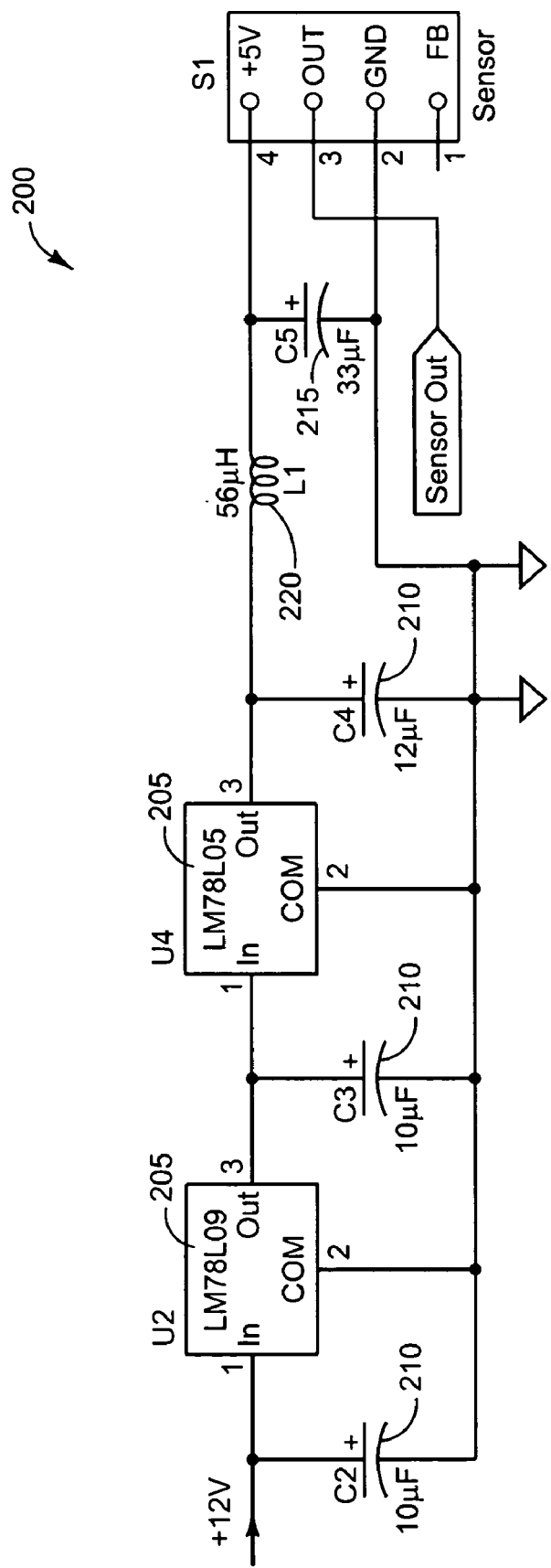
FIG. 2 is a schematic diagram of a double-regulated power supply circuit in accordance with one embodiment of the present application.

FIG. 2 is a schematic diagram of a double-regulated power supply circuit 200 in accordance with one embodiment of the present application. The circuit 200 preferably comprises a plurality of voltage regulators 205 and a plurality of capacitors 210 connected between ground and the voltage input and output pins of each regulator 205. In the illustrated embodiment, the voltage regulators 205 comprise National Semiconductor's LM78XXX series, 3-terminal positive regulators, and the capacitors 210 comprise tantalum capacitors with a capacitance of about 10-microfarads. This provides minimal input power supply variation and permits the temperature coefficient of the fluxgate sensor to be the limiting performance factor.

As shown in FIG. 2, further noise filtering of the fluxgate sensors can be accomplished by placing a capacitor 215 between the input and ground terminals of each sensor 155, and placing an inductor 220 in series with the input terminal of each sensor 155. In the illustrated embodiment, the capacitor 215 has a capacitance of about 33-microfarads, and the inductor 220 has an inductance of about 56 micro-henries.

In some embodiments, the sensors 155 are highly directional, meaning that variations in direction with respect to the earth's naturally occurring magnetic field can easily swamp or mask out small anomalies when the sensors 155 are moved. Due to the directionality of the sensors 155, when building the sensor array 105 it is desirable to align the physical axes of the sensors 155 in the same direction. The physical axis of each sensor 155 can be determined by observing the physical layout of the sensor 155. In some embodiments, the sensors 155 comprise fluxgate sensors having pin connections on one end of a tubular assembly that makes up the sensor 155. These pins are preferably physically oriented in the same direction when building the sensor array 105. This ensures the physical axes are aligned to all other sensors 155 utilized in the construction of the sensor array 105.

The sensors 155 can be further physically aligned and electronically tuned. The sensor array 105 is constructed as a gateway such that people are able to walk through the tuned sensor array 105 to be screened. The alignment techniques described herein allow the sensor array 105 to be very sensitive to magnetic fields, which are present and surround ferromagnetic materials. Ferromagnetic materials directly affect the earth's naturally occurring magnetic field gradient. The physical alignments and electrical tuning described herein produce a coplanar gradient sensor array 105, with the ability to detect these small disturbances in the naturally occurring earth magnetic field gradient, as they pass through the sensing region of the coplanar sensor array 105.

In one exemplary embodiment, eight fluxgate magnetic sensors are used to construct the coplanar gradient sensor array 105. As illustrated in FIG. 1, four sensors 155 are on the right side and four sensors 155 are on the left side. In this exemplary embodiment, the sensors 155 are spaced approximately sixteen inches apart, with lower most sensors 155 in the array 105 being approximately nine inches off the ground. This spacing allows a full body screening for contraband items of persons of average adult height. However, any combination of numbered fluxgate sensors may be used. The number of sensors 155 used may be limited by the physical layout of the desired walk-through coplanar sensor array 105 or the number of data acquisition channels desired or deemed sensible when designing a weapons/contraband screening system.

The sensor array 105, when complete, may be oriented in a vertical, slanted, or horizontal direction. The sensors 155 can be placed at any perceived spacing interval deemed necessary for the application. In some embodiments, the sensors 155 should be spaced no greater than 16 inches apart. The sensors 155 may exhibit a highly sensitive radius region, which surrounds the sensors 155, of approximately 20 inches. This sensitivity radius region quickly degrades beyond the 20-inch distance. When building the sensor array 105, it is generally desirable that the physical direction or axis of each sensor 155 be the same, and that the angular and electronic adjustments described herein be performed. This allows the coplanar gradient sensor array 105 to be constructed into doorway frames, or be installed into landscaping concrete or any other configuration for covert installations for personnel screening.

Further physical alignment of the sensors 155 making up the coplanar gradient sensor array 105 can be performed by adjusting the physical angular orientation of each sensor. This adjustment is made such that each sensor 155 in the array 105 is observing the same natural earth magnetic field gradient as a selected reference sensor in the sensor array 105. In some embodiments, to allow the angular alignment to be performed, the sensors 155 are mounted in an appropriately rigged mechanical fixture, which is attached to the support structure 110.

Figure 3:
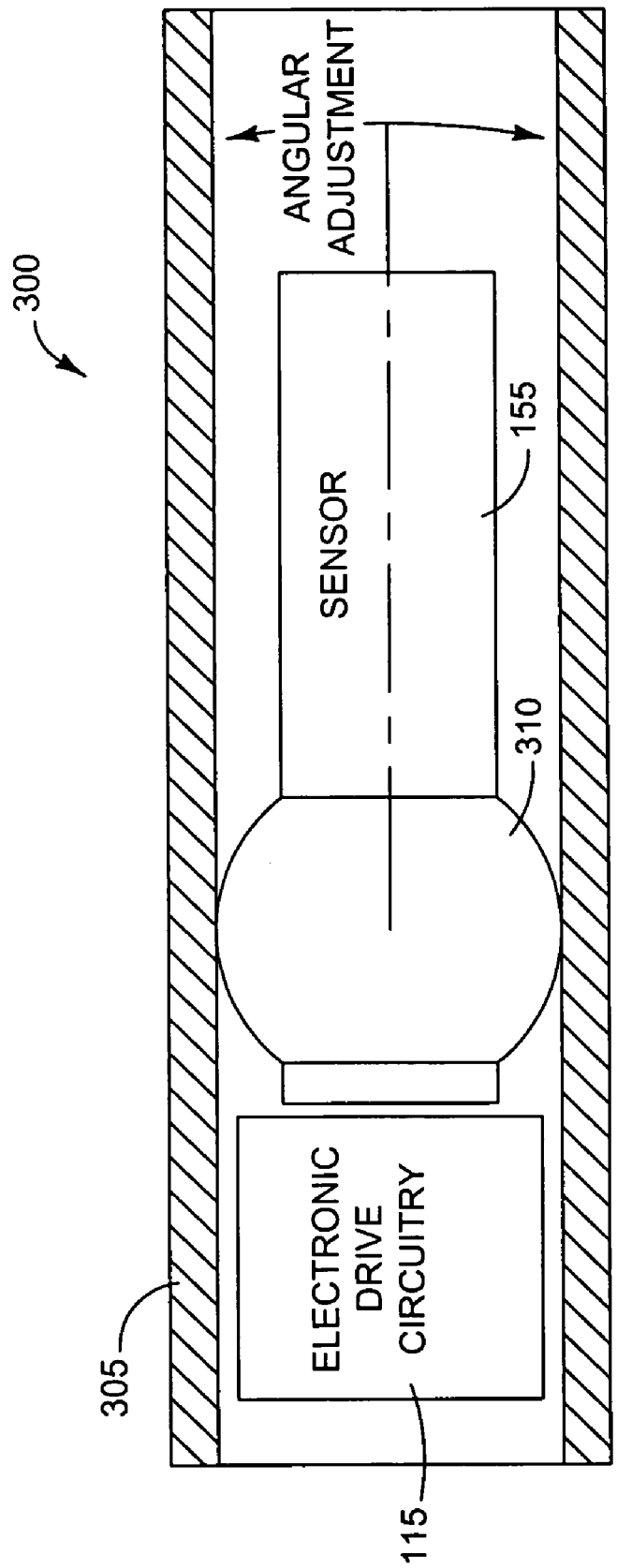
FIG. 3 is a cross-sectional diagram of a sensor mounted in a fixture, in accordance with one embodiment of the present application.

FIG. 3 is a cross-sectional diagram of a sensor 155 mounted in a fixture 300, in accordance with one embodiment of the present application. In the illustrated embodiment, the fixture 300 comprises a tube 305 made from a non-magnetic material such as wood, plastic, or aluminum. For example, in one embodiment, the tube 305 comprises schedule 80 PVC pipe having a length of about four inches and a diameter of about one inch. The PVC pipe can bored out to an inside diameter of about one inch.

As shown in FIG. 3, the sensor 155 can be mounted to the tube 305 with a spherical member 310. For example, in some embodiments, the spherical member 310 comprises a nylon ball having a diameter of about one inch, which is bored out with a hole having a diameter of about $9/16$ inch. The sensor 155, which may have a tapered body as shown in FIG. 3, can be inserted firmly into the hole to hold the sensor body in place and to allow angular adjustment of the sensor 155. This assembly can then be placed into the prepared length of PVC pipe described above. The pipe and the inserted ball assembly act as a ball and socket or pivot point for angular adjustment of the sensor 155. In some embodiments, this configuration allows approximately six degrees of total angular adjustment of the sensor 155. The completed assemblies can then be mounted to the support structure 110 at the recommended spacing to create the sensor array 105. The angular alignment can be performed on each sensor 155, with the exception of a selected reference sensor, as discussed in more detail below.

In some embodiments, the electronic tuning of the sensor array 105 is accomplished by digitally mixing a reference background-produced frequency with the background-produced output frequency generated by each sensor 155, which is caused by the earth's naturally occurring magnetic field. Since the physical axes of the sensors 155 are in the same orientation, the background-produced frequency of each sensor 155 will be within a few hertz of the other sensors 155 in the sensor array 105. In some embodiments, the sensors 155 have a background-produced frequency that is in the range of about 50-hertz to about 120-kilohertz, depending on the orientation of the sensor 155 to the earth's natural magnetic field. The reference background-produced frequency or reference oscillation frequency, can be measured and set by selecting and measuring the output frequency of one of the midmost sensors 155 in the coplanar gradient sensor array 105. This selected sensor 155 becomes then the reference sensor, as all other sensors 155 in the array will be aligned to it.

The reference oscillation frequency is measured and reproduced by the control module 165. This measured and reproduced frequency is then applied to the digital mixer circuitry of each sensor 155, during operation of the screening gateway. The digital mixing of the background-produced output frequency of each sensor 155 with the reference oscillation frequency effectively cancels the background-produced frequency produced by the earth's naturally occurring magnetic field, for each sensor 155. This allows very small magnetic field anomalies to be detected by the coplanar gradient sensor array 105 without interference from background-produced noise caused by the earth's natural magnetic field.

Each sensor 155 used to produce the coplanar gradient sensor array 105 is electronically tuned to each other sensor 155 in the sensor array 105. In some embodiments, the sensors 155 output a 5-volt rectangular pulse train with a period, or frequency measurable signal that is directly proportional to the magnetic field detected. The output frequency of each sensor 155 is digitally mixed with a reference oscillation or background frequency. This background frequency is measured from a selected midmost reference sensor 155 in the sensor array 105, which is oriented parallel to the earth's naturally occurring magnetic field or on horizontal level. The output frequency from the digital mixer 145 of each individual sensor 155 is the absolute difference between the reference oscillation frequency and the background-produced frequency of the respective sensor 155. The frequency output of each digital mixer 145 can then be converted to a voltage level using a frequency-to-voltage converter 140, which can be directly measured by commonly available test equipment and computer data acquisition measurement instruments.

In some embodiments, the physical angular orientation of each sensor 155 is adjusted to tune the coplanar gradient sensor array 105 to one naturally occurring earth magnetic field gradient. This angular alignment is accomplished by applying the reference oscillation frequency to the digital mixer 145 of each sensor 155 as described above. The output of each sensor's frequency-to-voltage converter 140 is then measured and the physical angular orientation of each sensor 155 is adjusted to obtain a near zero voltage output measurement from the output of the respective sensor's frequency-to-voltage converter 140. In some embodiments, this voltage level should be adjusted to about 200-400 millivolts to maintain maximum stability of the sensor array 105. This alignment is completed for each sensor 155 in the coplanar sensor array 105, with exception to the selected reference sensor 155, which is on horizontal level or parallel to the naturally occurring earth magnetic field gradient.

In some embodiments, the sensors 155 output a 5-volt rectangular pulse train or frequency signal. Due to the potentially long wiring lengths used in the construction of the sensor array 105, the output signal can be degraded, making it necessary to condition the output signals received from each sensor 155. This can be accomplished by utilizing an inverting buffer with Schmitt-trigger action or equivalent circuitry. An example of a buffer device that may be used is a Philips Semiconductor 74HC14E. This buffer device outputs a clean square-wave signal for the digital mixing of the output frequency of each sensor 155.

Figure 4:
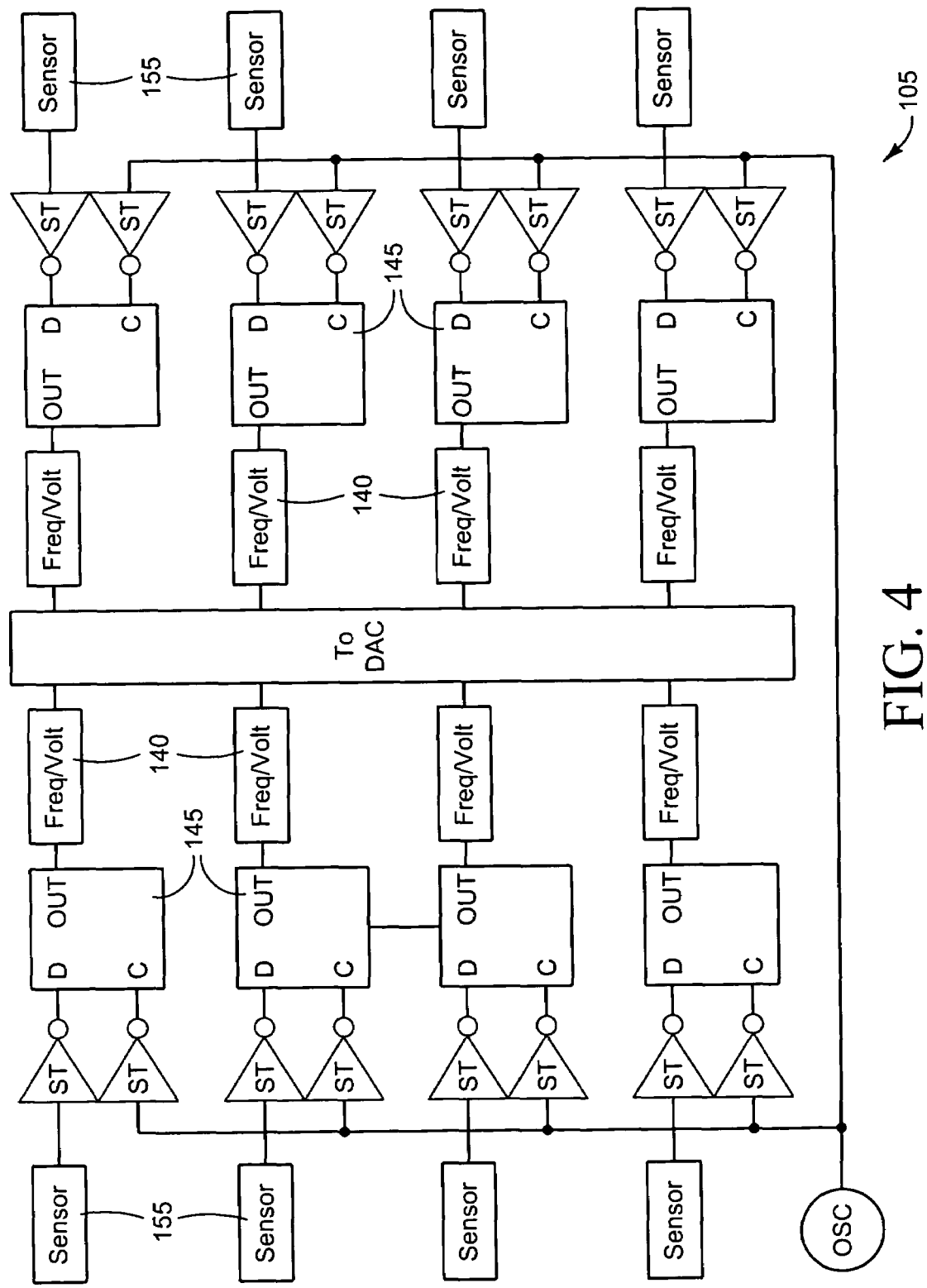
FIG. 4 is a block diagram of a sensor array in accordance with one embodiment of the present application.

FIG. 4 is a block diagram of a sensor array 105 in accordance with one embodiment of the present application. As described above, each sensor 155 has a corresponding digital mixer 145. In the illustrated embodiment, the digital mixers 145 comprise D-type flip-flop bistable circuits.

Figure 5:
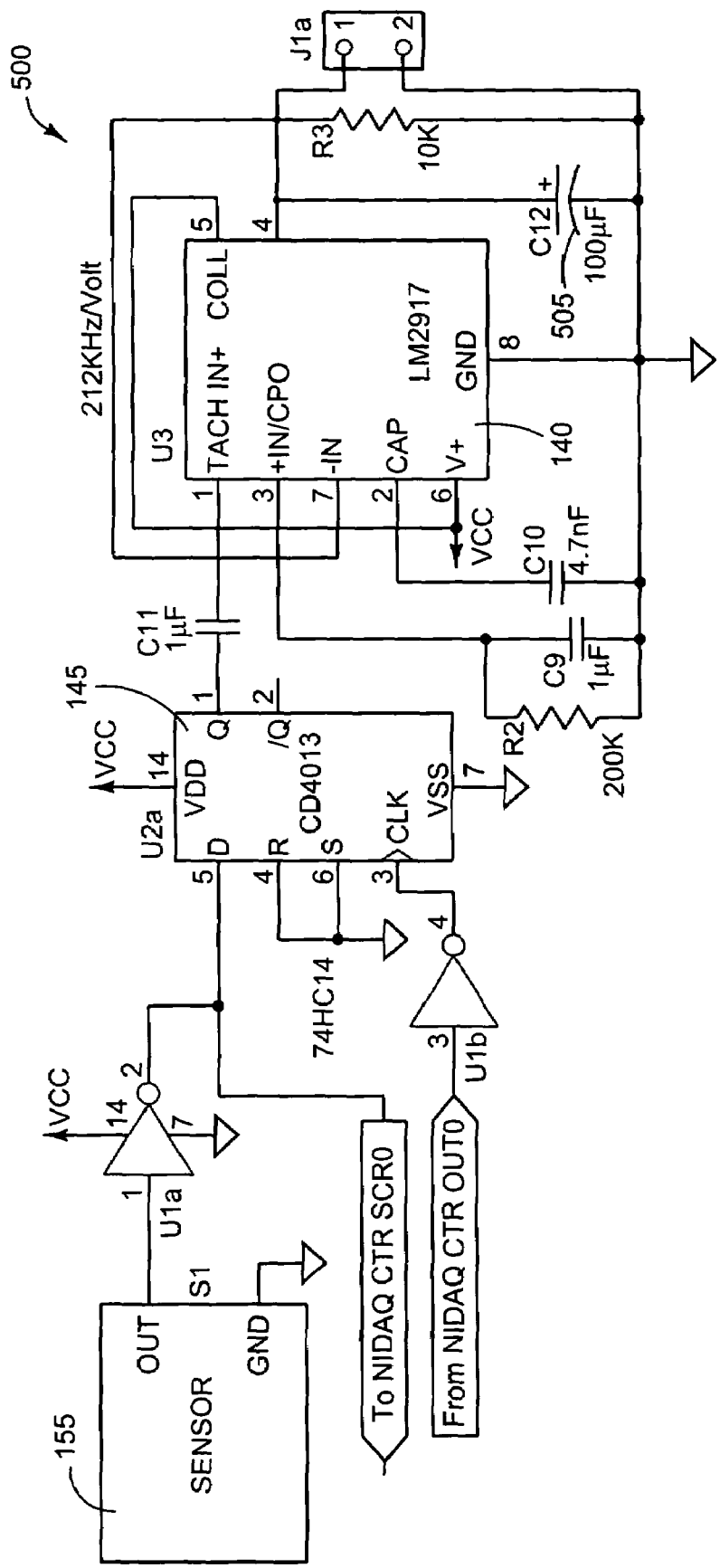
FIG. 5 is a schematic diagram of an exemplary D-type flip-flop bistable circuit in accordance with one embodiment of the present application.

FIG. 5 is a schematic diagram of an exemplary D-type flip-flop bistable circuit 500 in accordance with one embodiment of the present application. An example device that can be used is a Fairchild Semiconductor CD4013BC. In the illustrated embodiment, the D-input of each bistable circuit is supplied from the sensor's output, which is buffered, and the clock source of the bistable circuit is supplied from the reference sensor's background-produced frequency, which is also buffered. The output of each digital mixer is a frequency, with a range of zero to several kilohertz. In some embodiments, unused inputs and outputs of the bistable device are properly terminated or grounded, and proper digital filtering for the circuitry is practiced.

In operation, the frequency output of each digital mixer 145 or bistable device is converted to a voltage or detection level using a frequency-to-voltage converter 140. Example frequency-to-voltage converters that can be used include the National Semiconductor, LM2907N or LM2917. This frequency-to-voltage converter has a programmable working frequency range that is calculated against the working frequency range the designer wishes to utilize. In some embodiments, the frequency-to-voltage converter 140 is designed to have a response range of approximately 212-hertz per one-volt output. Other programmable frequency response ranges and output voltages for the frequency-to-voltage converter may be calculated and used, depending on the application and the objective.

In some embodiments, to obtain clean output voltages from the frequency-to-voltage converter 140, its output terminal is filtered using a capacitor 505 connected between the output terminal and ground. In the illustrated embodiment, the capacitor 505 comprises a 100 μF-aluminum capacitor. This supplies output voltages that have very little ripple for measurement purposes. The circuitry described can be included and constructed into the sensor body assembly itself or constructed separately, using stand-alone electronic wiring boards, printed circuit cards, or electronic bread boards.

The output of each sensor 155 is buffered and digitally mixed with the buffered background-produced reference frequency produced by the earth's natural magnetic field and output via a D-type bistable. The frequency output of each bistable device is converted to a voltage level by a frequency-to-voltage converter 140. These voltage levels are read by computerized data acquisition circuitry 120. The data acquisition circuitry 120 reads the voltage data from the coplanar gradient sensor array 105 into a computer-readable format, so that software can be programmed to manipulate the data, to provide an end user an easily decipherable user interface 160. In some embodiments, when constructing the coplanar gradient sensor array 105, proper electronic signal conditioning and routing techniques should be utilized, which include using twisted pair wiring or shielded coaxial cable for signal routing, to minimize outside electrical interference and noise from entering into the system 100.

The data acquisition circuitry 120 may comprise any appropriate data acquisition device that can convert voltage data into computer decipherable data. For example, a National Instruments', PCI-6024E data acquisition circuit card (DAQ) may be utilized. Many suitable computerized DAQ cards exist and can be selected for use in the system 100 if they have the proper number of analog and digital input and output channels. In some embodiments, the DAQ must have at least eight analog input channels for reading the voltage levels of the coplanar sensor array 105. Also desired for the DAQ is one digital input/output channel for reading the infrared break-beam trigger signal, and two timing input/output channels for measurement and reproduction of the background produced reference frequency of the coplanar array 105.

In operation, the data acquisition circuitry 120 can be controlled by its supplied software drivers and the system's control module 165. The control module 165 described herein can be written to interpret the voltage readings obtained from the coplanar gradient sensor array 105 or gateway during a screening process. As people walk through the gateway, one or more infrared break-beam devices 170 are triggered. The infrared break-beam device 170 may comprise any of a wide variety of suitable devices available commercially, with a sufficient operational range. In some embodiments, the infrared break-beam device 170 has an operational range greater than about 30 inches, the recommended inside width of the coplanar sensor array 105.

In some embodiments, the infrared break-beam device 170 is placed near the foot region of the gateway, to ensure individuals of all statures cause a trigger by breaking the infrared beam. The infrared break-beam trigger is detected by the control module 165. When a trigger from the infrared break-beam device 170 is detected, the control module 165 starts a data and imagery acquisition read event, beginning the screening process.

In some embodiments, the control module 165 acquires 2,000 points of data from the coplanar sensor array 105, per channel, during the screening process. In these embodiments, the screening process takes approximately one second to complete. The sensor array output data is then mathematically or algorithmically manipulated, and the artificial intelligent algorithms in the control module 165 interpret the manipulated data as necessary to produce a user decipherable output to the user interface 160.

In some embodiments, the control module 165 utilizes simple to complex algorithms to translate the gateway output data into human interpretable displays on the user interface 160. The control module 165 may utilize geometric parameters to mathematically interpret the output data from the sensor array 105. The control module 165 may comprise software written in any suitable computer language. For example, National Instrument's LabVIEW, version 7.0 can be used to write suitable software for use in the control module 165.

In some embodiments, the user interface 160 utilizes color to quickly alert the operator if an alarm condition occurred during a screening process. The user interface 160 contains threshold controls to set alarm set points and colors to aid the operator in the differentiation of detected items. The control module 165 for the screening system 100 also gives the operator access to other system parameters and programs. These programs and parameters include a warm-up routine, alignment and maintenance routines, user logon routines, historical screening image and data review, and system operational logs. The user interface 160 can be customized to suit the varying requirements of any end user.

The control module 165 controls the image acquisition during a screening process via the infrared break-beam trigger. When a trigger is received, the control module 165 begins the data acquisition and image acquisition cycle. A video frame grabber 125 is installed into the computer control unit 135, which converts the video image data into computer decipherable data. The video frame grabber 125 may comprise a monochrome or color video image capture device. For example, a National Instruments', PCI-1407 Frame Grabber circuit card may be utilized. When an infrared break-beam trigger is received by the control module 165, the frame grabber 125 is triggered by the control module 165 to immediately acquire an image of the person entering the screening gateway. This image is then overlaid with the manipulated data read from the coplanar sensor array. This overlaid data depicts the peak detection levels measured during the screening process.

In some embodiments, a video camera 130 is connected to the frame grabber 125 in the computer control unit 135 via a BNC connector equipped RG-59 coax cable. The video camera 130 may comprise any suitable monochrome or color RS170 video camera. For example, a Pulnix, model TM-7AS monochrome camera may be utilized. As shown in FIG. 1, the camera 130 is fitted with a lens 175. The focal length of the lens 175 is calculated to obtain a stature image of the gateway in the field of view of the captured image. For example, a Tamron, 2.8-12 mm, varifocal length lens may be utilized. In some embodiments, the camera 130 is aimed at the coplanar sensor array 105 and placed in the portrait orientation, meaning that the camera's typical horizontal width is oriented vertically.

Typically, video cameras output two fields of video information, an odd field and an even field, which makes up a video frame. In some embodiments, the video frame grabber 125 is set up, via its supplied software driver, to acquire or grab only the even field. This prevents field streaking in the obtained image due to motion of the person being screened. This motion streaking is caused by the delay between the odd and even video fields. This delay is typically 16.67 milliseconds for the RS170 video standard. The control module 165 manipulates and corrects the video image grabbed during a screening event, by placing the even field grabbed image information in both the even and odd fields, for the computer control unit's display on the user interface 160.

This application describes a system 100 for contraband and weapons detection. As described above, the system 100 comprises a coplanar sensor array 105, electronic drive circuitry 115, a data acquisition circuit 120, a video frame grabber 125, a video camera 130, and a computer control unit 135 with the control module 165 installed. Properly constructed and aligned, the system 100 allows for the detection of very small magnetic moments, which surround ferromagnetic materials. This ferromagnetic detection allows users to screen personnel for contraband electronic devices and concealed weapons.

In some embodiments, modifying the control module 165 to operate the screening system 100 in a continuous scan mode allows for the detection of items tossed or kicked into the sensing region of the gateway. In this mode, the data acquisition system is continually reading the coplanar sensor array's output data. This data is compared to predetermined threshold limits set by the system operator. If any of the read data is above the predetermined set threshold limits, a complete screening event is triggered, including the acquisition of imagery of the item tossed or kicked into the screening region. The control module 165 manipulates the data and the resultant output data is sent to the user interface 160 informing the operator of the detection event.

In some embodiments, a Field Programmable Gate Array (FPGA) electronic device is utilized for signal conditioning and routing of the output data from the coplanar sensor array 105. FGPA devices offer many configurations and interfaces for manipulation of electronic data. The advantages of using FPGA devices are the reduction of electronic components used, the deletion of the computer hardware, and the ability to design the data acquisition circuitry and computer interface into one electronic component. These advantages allow the system 100 to be constructed such that the weapons/contraband detection apparatus can be a standalone device. This can reduce the cost for manufacturing the completed system and allow for cost effective mass production of a stand-alone system.

Further enhancement of the data acquisition circuitry 120 can be realized by implementing USB bus, Ethernet, or wireless data acquisition to obtain the voltage readings from the coplanar gradient sensor array. These technologies can advantageously provide networking capability, wireless data acquisition capability, or allow the manufacturer the ability to offer the completed coplanar gradient sensor array 105 as a stand-alone computer peripheral. In some embodiments, wired data acquisition circuitry 120 is utilized. In some settings (e.g., certain homeland security applications), it is desirable to perform contraband detection from a safe distance to protect system operators from possible hazards introduced by untrustworthy patrons upon the system detecting a contraband item. In these settings, wireless transmission of the resultant screening event would protect security personnel and enable long distance personnel screening.

Though fluxgate style sensors are utilized to detect the presence of a magnetic field in some embodiments, many other magnetic field sensing devices are available on the market, which can also be utilized. One such device is a magneto-resistive effect type magnetic field sensor. These sensors output voltage levels in the microvolt range and require only amplification of the output voltage levels to be useful in the system 100.

In some embodiments, eight fluxgate sensors are utilized for the detection of small magnetic moments, enabling the system 100 to detect weapons and electronic recording devices. In other embodiments, many more sensors 155 can be utilized in the construction of the system 100. The advantages of increasing the number of sensors 155 would be an increase in the output data resolution of the detected ferromagnetic item within the sensing region 105. This resolution increase would allow better magnetic field signature data to be collected for detected items. This enhanced data would then allow for very accurate probabilistic identification of the detected items using neural network or artificial intelligence algorithms. The increased resolution data collected also allows for the possibility of three dimensional location data to be derived for the detected item.

In some embodiments, basic artificial intelligence is used in the control module 165. In other embodiments, more complex artificial intelligence is utilized, greatly improving the identification abilities of the system 100. This artificial intelligence can be in the form of neural network functions, fuzzy logic functions, or other algorithmic artificial intelligence functions.

In some embodiments, self-contained power systems can be used for complete system power and operation, allowing portable use of the contraband/weapons screening system 100. These power systems include solar, fuel cell, battery, gas or air operated generators.

In some embodiments, the user interface 160 is instilled into the screening gateway itself, rather than utilizing a computer system such as a desktop or laptop computer. Many self-contained micro controller unit (MCU) integrated circuits exist on the commercial market. The implementation and programming of such devices allows the operational code, including the user interface 160, to be contained completely in these devices. The implementation of such devices, eliminating the computer hardware, advantageously allows the contraband/weapons detection gateway to be constructed as a standalone apparatus.

In some embodiments, electromechanical devices and feedback are used to automate the physical angular alignment of the sensors 155, thereby improving the usability of the system 100 and more readily maintaining the calibration of the system 100, when moved from one location to another. These electromechanical devices may be motors, linear positional devices, or electronic muscle wire, which contracts when electrical power is applied. The feedback system may comprise any suitable system, such as, for example, fuzzy logic style controlled feedback.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A method for detecting ferromagnetic objects within a sensing region of an array of magnetic field fluxgate sensors, the method comprising:
   receiving a signal to initiate a data acquisition and image acquisition cycle;
   generating a plurality of first output signals, each first output signal having a frequency that is substantially proportional to a magnetic field detected by a corresponding magnetic field fluxgate sensor;
   generating a plurality of second output signals, each second output signal having a frequency that substantially comprises an absolute difference between the frequency of a first output signal and the frequency of a corresponding background reference signal;
   converting the frequency of each second output signal to a corresponding voltage level;
   acquiring an image of a person within the sensing region of the array of magnetic field fluxgate sensors; and
   displaying the image of the person, overlaid with data representing the voltage levels corresponding to the frequencies of the plurality of second output signals,
   wherein the overlaid data indicates the magnitude and location of magnetic moments surrounding ferromagnetic objects within the sensing region.

2. The method of claim 1, wherein receiving a signal to initiate a data acquisition and image acquisition cycle comprises receiving a signal from an infrared break-beam device.

3. The method of claim 2, wherein the infrared break-beam device has an operational range of at least about 30 inches.

4. The method of claim 1, wherein the data acquisition and image acquisition cycle takes about one second to complete.

5. The method of claim 1, wherein each background reference signal has a frequency in the range of about 50-hertz to about 120-kilohertz.

6. The method of claim 1, wherein the overlaid data depicts the peak voltage levels detected during the data acquisition cycle.

7. The method of claim 1, further comprising applying artificial intelligence to aid in determining whether a detected ferromagnetic object is a threat or a non-threat item.

8. The method of claim 7, wherein the artificial intelligence comprises geometric parameters, neural network functions, or fuzzy logic functions.

9. The method of claim 1, further comprising sounding an audible alarm or closing a door when a voltage level is detected which satisfies a selected threshold condition.

10. The method of claim 1, further comprising displaying a first color when a first detection threshold condition is satisfied and displaying a second color when a second detection threshold condition is satisfied.

11. The method of claim 1, wherein the array of magnetic field fluxgate sensors comprise eight magnetic field fluxgate sensors arranged in two columns of four sensors each, wherein the sensors in each column are spaced approximately 16 inches apart, and wherein the lower most sensors in each column are located approximately 9 inches off the ground.

12. The method of claim 1, wherein each magnetic field fluxgate sensor comprises a drive coil wound around a magnetically permeable core material, and a sensing coil wound perpendicularly around the drive coil and the core material.

13. The method of claim 1, wherein each magnetic field fluxgate sensor is configured to detect magnetic fields in the range of about ±50 micro-tesla.

14. The method of claim 1, wherein each magnetic field fluxgate sensor exhibits a sensitive radius region of about 20 inches.

15. The method of claim 1, wherein electronic drive circuitry is integrated into a body of each magnetic field fluxgate sensor.

16. The method of claim 1, wherein acquiring an image of a person comprises utilizing an analog video camera, digital video camera, USB camera, Firewire camera, or wireless network camera.

17. The method of claim 1, wherein the magnetic field fluxgate sensors are coupled to electronic drive circuitry, data acquisition circuitry, and a computer control unit via twisted pair wiring or shielded coaxial cable.

18. The method of claim 1, wherein a Field Programmable Gate Array electronic device is utilized for signal conditioning and routing of the output data from the array of magnetic field fluxgate sensors.

19. The method of claim 1, further comprising conditioning the output signals generated by the magnetic field fluxgate sensors.

20. The method of claim 1, further comprising physically aligning each magnetic field fluxgate sensor via a ball and socket joint configured to enable angular adjustment of the corresponding sensor.

21. The method of claim 20, wherein the ball and socket joint enables about 6 degrees of angular adjustment to the corresponding sensor.

22. The method of claim 1, further comprising physically aligning each magnetic field fluxgate via an electromechanical device and a feedback system.

23. The method of claim 22, wherein the electromechanical device comprises a motor, linear positional device, or an electronic muscle wire.

24. The method of claim 1, further comprising electronically tuning each magnetic field fluxgate sensor with a digital mixer.

* * * * *